United States Patent
Pohl et al.

(10) Patent No.: US 10,350,519 B2
(45) Date of Patent: Jul. 16, 2019

(54) DEVICE FOR FILTERING A PLASTIC MELT

(71) Applicant: Maag Automatik GmbH, Grossostheim (DE)

(72) Inventors: Harald Pohl, Hoerstel (DE); Markus Steinmann, Zurich (CH)

(73) Assignee: Maag Automatik GmbH (DE)

( * ) Notice: Subject to any disclaimer, the term of this patent is extended or adjusted under 35 U.S.C. 154(b) by 78 days.

(21) Appl. No.: 15/323,333

(22) PCT Filed: Jun. 29, 2015

(86) PCT No.: PCT/EP2015/001308
§ 371 (c)(1),
(2) Date: Dec. 30, 2016

(87) PCT Pub. No.: WO2016/000816
PCT Pub. Date: Jan. 7, 2016

(65) Prior Publication Data
US 2017/0128861 A1  May 11, 2017

(30) Foreign Application Priority Data

Jul. 1, 2014 (DE) .................. 10 2014 009 768

(51) Int. Cl.
*B01D 29/96* (2006.01)
*B29C 48/69* (2019.01)
(Continued)

(52) U.S. Cl.
CPC ......... *B01D 29/96* (2013.01); *B01D 29/0097* (2013.01); *B29C 48/69* (2019.02);
(Continued)

(58) Field of Classification Search
None
See application file for complete search history.

(56) References Cited

U.S. PATENT DOCUMENTS

| | | |
|---|---|---|
| 4,070,138 A | 1/1978 | Stanwood |
| 4,416,605 A * | 11/1983 | Konno .................. B29C 47/682 210/236 |

(Continued)

FOREIGN PATENT DOCUMENTS

| | | |
|---|---|---|
| DE | 1800169 A1 | 4/1970 |
| DE | 9105000 U1 | 8/1991 |

(Continued)

*Primary Examiner* — Benjamin M Kurtz
(74) *Attorney, Agent, or Firm* — St. Onge Steward Johnston & Reens, LLC

(57) ABSTRACT

A device for filtering a plastic melt, including a housing and a filter pin which is axially and/or radially movable therein. In a working position of the filter pin, plastic melt passes from an inlet channel, through a filtering mechanism, which is detachably fastened to the filter pin, to an outlet channel. In a filter change position of the filter pin, the filtering mechanism is freely accessible for replacing the filtering mechanism, and wherein at least one drainage channel is formed in the filter pin. In a start-up position of the filter pin, one end of the at least one drainage channel is in fluid connection with the at least one inlet channel in order to receive the plastic melt that is fed through the at least one inlet channel and to output the plastic melt at another end of the at least one drainage channel.

10 Claims, 2 Drawing Sheets

(51) Int. Cl.
*B01D 29/00* (2006.01)
*B29C 48/27* (2019.01)
*B29B 15/00* (2006.01)
*B29K 101/12* (2006.01)

(52) U.S. Cl.
CPC .......... *B29B 15/00* (2013.01); *B29C 48/2725* (2019.02); *B29K 2101/12* (2013.01)

(56) References Cited

U.S. PATENT DOCUMENTS

| | | | | |
|---|---|---|---|---|
| 4,507,072 A | * | 3/1985 | Gaul, Jr. | B29C 47/74 210/236 |
| 5,840,197 A | * | 11/1998 | Ishida | B29C 47/681 210/780 |
| 6,533,934 B1 | * | 3/2003 | Trendelkamp | B01D 29/01 210/236 |
| 2006/0163145 A1 | * | 7/2006 | Bacher | B29C 47/0815 210/411 |
| 2013/0292316 A1 | * | 11/2013 | Pohl | B29C 47/687 210/236 |

FOREIGN PATENT DOCUMENTS

| | | |
|---|---|---|
| DE | 19834302 A1 | 11/1999 |
| DE | 202010014709 U1 | 1/2011 |
| DE | 202014001675 U1 | 5/2014 |
| GB | 2159064 A | 11/1985 |
| WO | WO 2012/055528 * | 5/2012 |

* cited by examiner

DEVICE FOR FILTERING A PLASTIC MELT

FIELD OF THE INVENTION

The invention relates to a device for filtering a plastic melt, in particular a thermoplastic melt. The device comprises a housing which has at least one inlet channel and at least one outlet channel for the plastic melt, wherein the at least one inlet channel is separated from the at least one outlet channel by at least one cavity for accommodating at least one filter pin which is axially and/or radially movable therein, wherein the at least one filter pin has a filter section to which at least one filtering means is detachably fastened so that the filter section of the at least one filter pin and the at least one filtering means define a filtrate cavity, wherein, in a working position of the filter pin, the plastic melt can pass from the at least one inlet channel through the filtering means to the filtrate cavity and the filtrate cavity is in fluid connection with the at least one outlet channel, and wherein, in a filter change position of the filter pin, the filtering means is freely accessible for replacing the filtering means.

BACKGROUND OF THE INVENTION

A device for filtering a plastic melt is known for example from German laid-open specification DE 1 800 169.

Such devices are usually arranged before or after a start-up device, as is known for example from German patent DE 198 34 302 C2 in connection with a filter device arranged downstream thereof. It is therefore necessary to provide two different devices, which gives rise to an associated outlay in terms of material, system size and costs.

SUMMARY OF THE INVENTION

The object of the present invention is thus to provide a device for filtering a plastic melt which overcomes the disadvantages of the prior art, and in particular to specify a device for filtering a plastic melt which can be used without providing an additional start-up device.

This object is achieved according to the invention by a device having the features of the independent claim. Preferred embodiments of the invention are defined in the sub-claims.

The device according to the invention for filtering a plastic melt, in particular a thermoplastic melt, comprises a housing which is provided with at least one inlet channel and at least one outlet channel for the plastic melt to be filtered. The at least one inlet channel is separated from the at least one outlet channel by at least one filter cavity, preferably by at least one filter cavity running perpendicular to said channels, particularly preferably a cylindrical filter cavity, wherein there is arranged inside the at least one filter cavity a filter pin which is displaceable or movable therein in an axial and/or radial direction, so that the at least one inlet channel is thereby separated from the at least one outlet channel. The movement or displacement may advantageously take place by means of a hydraulic device. The filter pin is in this case preferably arranged so precisely within the preferably cylindrical filter cavity that, without using additional sealing means, plastic melt is prevented from undesirably penetrating between the outer wall of the pin and the corresponding inner wall of the cylindrical filter cavity, even in the event of displacement of the filter pin. The at least one filter pin has a filter section to which at least one filtering means is detachably fastened, so that the filter section of the at least one filter pin and the at least one filtering means define a filtrate cavity. In a working position of the filter pin, the plastic melt can pass from the at least one inlet channel through the filtering means to the filtrate cavity and the filtrate cavity is in fluid connection with the at least one outlet channel so that the filtered plastic melt can be output by the at least one outlet channel. In a filter change position of the filter pin, the filtering means is freely accessible for replacing the filtering means. At least one drainage channel is also formed in the filter pin, wherein, in a start-up position of the filter pin, one end of the at least one drainage channel is in fluid connection with the at least one inlet channel in order to receive the plastic melt that is fed through the at least one inlet channel and to output the plastic melt at another end of the at least one drainage channel. The output may take place directly to the surrounding environment. Preferably, at least one discharge channel may also be formed in the housing so that, in the start-up position, plastic melt is output from the drainage channel of the filter pin into the discharge channel of the housing.

According to the invention, a compact and easily maintainable device is thus provided, in which the functionalities of a filtering device and a start-up device are combined.

Preferably, it may advantageously be provided that the filtering means is configured as a filter screen. The filtering means may be arc-shaped in cross-section and may preferably cover an angle of at least 180° and at most 270° of the circumference of the at least one filter pin, particularly preferably approximately 240° of the circumference.

In one preferred embodiment, at least one web is formed in the filter pin in the region of the filter section of the filter pin, which web extends preferably in the axial direction through the filtrate cavity, wherein the drainage channel is designed to run within the at least one web. By forming the web, an increased mechanical stiffness of the filter pin can be achieved in this region, which can lead to a correspondingly increased operational reliability. In addition, if the drainage channel is designed to run through the web, a shortening of the necessary length of the filter pin in the axial direction can be achieved.

The at least one web may in particular have a cross-section in the shape of a polygon, preferably in the shape of a hexagon. This shape is suitable for a relatively easy manufacture of the at least one web and at the same time allows a favourable and relatively undisrupted flow behaviour of the plastic melt within the filtrate cavity. It also proves to be advantageous to arrange the filtering means between the at least one web and the at least one inlet channel. With particular preference, the polygon or the preferred hexagon has rounded edges in a manner favourable to the flow.

According to the invention, the at least one web may preferably be arranged in such a way that a longitudinal axis of the filter pin is situated within the at least one web, which results in a particularly compact design that is favourable to the flow. It may also be possible to arrange the at least one web in a manner eccentrically offset from and parallel to the longitudinal axis of the filter pin.

It is particularly preferred if, according to one preferred embodiment, the filter pin has next to the filter section a further pin section which corresponds in cross-section to the cross-section of the filter cavity in the housing, so that it fills this filter cavity in the filter change position. The feeding and discharging of plastic material to be filtered can thus be interrupted solely thereby in a manner that is simple in terms of design, for example when replacing the filtering means.

It should be noted that the term plastic melt used in the present description may denote in particular a polypropylene, polyethylene, high-pressure polypropylene, low-pressure polyethylene, linear low-pressure polyethylene, polystyrene, polyamide, alkyl-butadiene-styrene (ABS), polyester, polyoxymethylene (POM), polyacrylate, polymethyl methacrylate (PMMA) and polyvinyl chloride melt. It should also be noted that the elements of the device according to the invention which are said to be cylindrical or circular may also have polygonal shapes.

BRIEF DESCRIPTION OF THE DRAWINGS

The device according to the invention will be explained by way of example in greater detail below with reference to the drawings, in which.

DETAILED DESCRIPTION OF THE INVENTION

Figure 1:
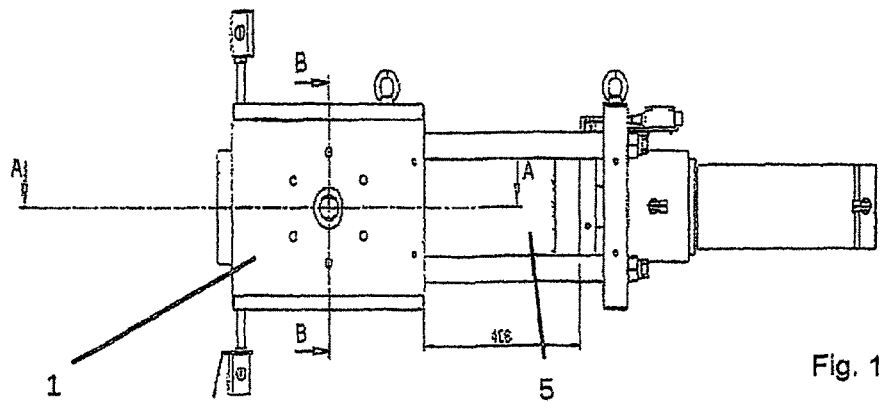
FIG. 1 shows a schematic diagram of a device according to the invention for filtering a thermoplastic melt.
Figure 2:
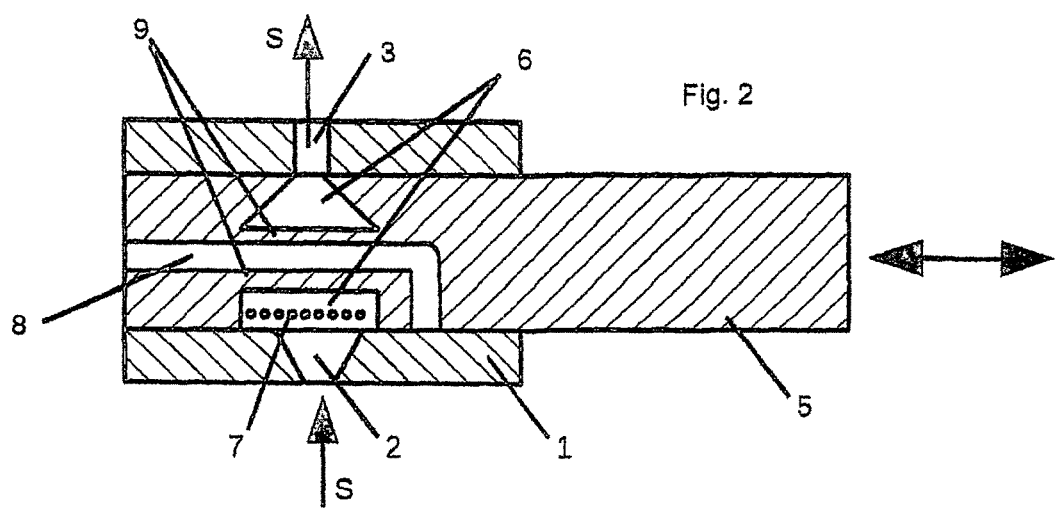
FIG. 2 shows a partial view in section along the line A-A in FIG. 1 in a working position.
Figure 3:
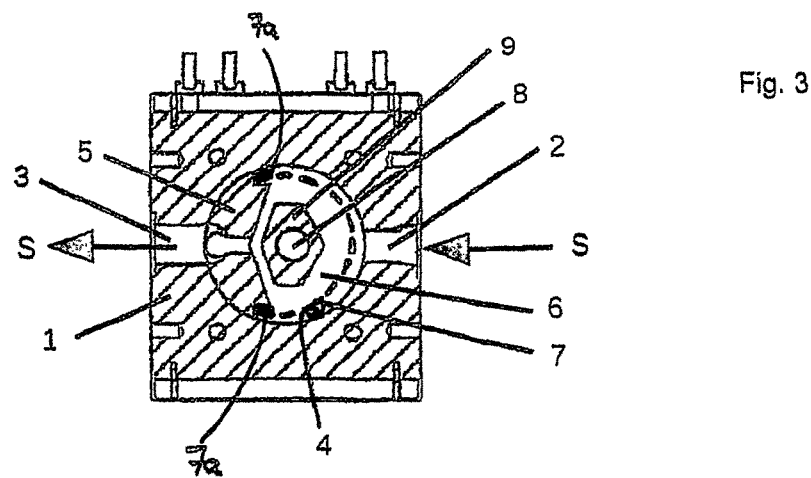
FIG. 3 shows a partial view in section along the line B-B in FIG. 1 in the working position.

FIG. 1 schematically shows a device for filtering a plastic melt according to the invention. As shown in FIG. 2 and FIG. 3 as partial views in section along the line A-A and respectively the line B-B in FIG. 1, the housing 1 is provided with a cylindrical filter cavity 4, wherein the filter cavity 4 is provided with a filter pin 5 which is axially displaceable therein. The axial displaceability is indicated by the double-headed arrow in FIG. 2. In order to bring about the axial displacement of the filter pin 5, a hydraulic element is assigned to the pin.

FIGS. 2 and 3 show the filter pin 5 in a filtering position or working position. As seen in the flow direction of the plastic melt S that is to be filtered, said plastic melt passes via an inlet channel 2 into the housing 1, from there into the filter cavity 4 in the housing 1, is guided there through the filtering means 7, through which the plastic melt passes to a filtrate cavity 6. The filtrate cavity 6 is defined by the filtering means 7 and the filter pin 5, or by the walls of the recess(es) which are formed in this region of the filter pin 5, which is to be referred to as the filtering region, in the filter pin 5. The filtered plastic melt S then passes from the filtrate cavity 6 to the outlet channel 3, which is in fluid connection therewith, and thus back out of the housing 1.

The filtering means 7 may be formed for example by a filter screen which is preferably arc-shaped in cross-section and in particular covers approximately 240° of the circumference of the filter pin 5. The filtering means 7 can be detachably fastened to the filter pin 5 in a suitable manner. To this end, fastening sections 7a may be provided for example, which extend in the axial direction and enable for example a screw fastening of the filtering means 7 to the filter pin 5.

Figure 4:
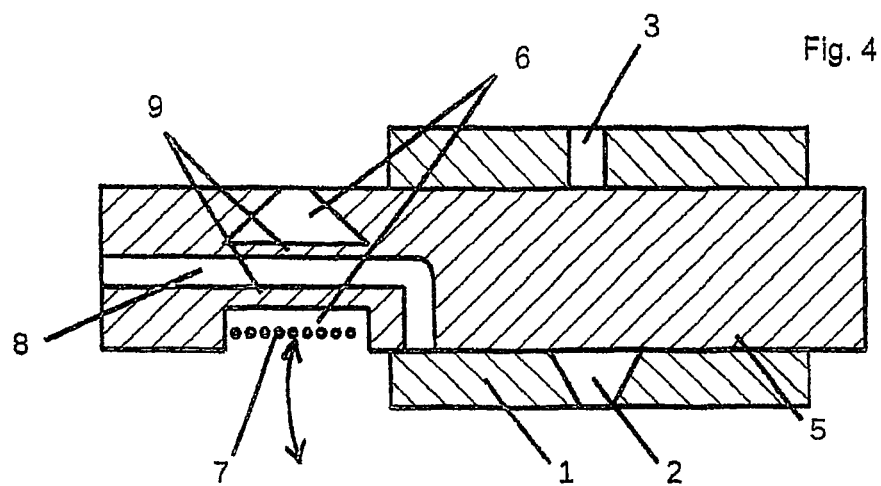
FIG. 4 shows a partial view in section along the line A-A in FIG. 1 in a filter change position.

As already indicated, the filter pin 5 is in a filtering position (working position) in the diagrams of FIG. 2 and FIG. 3. In contrast thereto, the filter pin 5 in the diagram of FIG. 4 is shown in a filter change position, in which the filtering means 7 is freely accessible from outside so that in this position it is possible to replace the filtering means 7, which is loaded with dirt particles for example, with an unloaded filtering means 7.

The cylindrical filter pin 5 is tailored to the diameter of the filter cavity 4 in the housing 1 in such a way that, even in the event of axial displacement of the filter pin 5 in the direction of the arrow in FIG. 2, no leakage occurs and thus plastic melt cannot undesirably escape either in the filtering position or in the filter change position. To this end, the filter pin 5 has a pin section which extends between the inlet channel 2 and the outlet channel 3 in the diagram of FIG. 4 and which corresponds in cross-section to the cross-section of the filter cavity 4 in the housing 1. The filter cavity 4 is thus suitably filled in the filter change position and prevents any flow of the plastic melt S.

Figure 5:
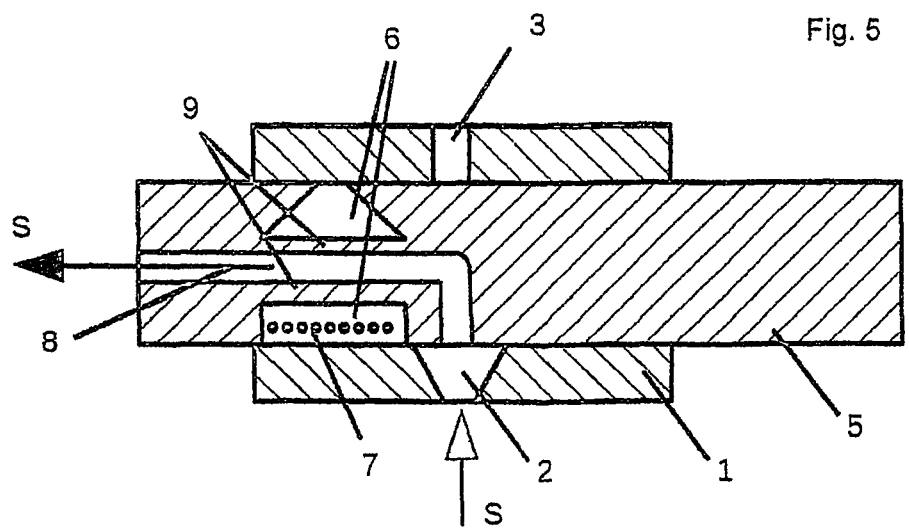
FIG. 5 shows a partial view in section along the line A-A in FIG. 1 in a start-up position.

The filter pin 5 is shown in a start-up position in FIG. 5. In this position, the inlet channel 2 in the housing 1 is in fluid connection with a drainage channel 8 which is formed in the filter pin 5. The drainage channel 8 receives the plastic melt S that is fed through the inlet channel 2 and outputs this at the other end of the drainage channel 8 to a suitable location, such as for example by way of a direct output into the surrounding environment at the axial end of the filter pin 5 in FIG. 5. In this way, in the start-up position, the device according to the invention can perform the functionality of a start-up device, namely that of temporarily keeping a flow of plastic melt away from the outlet channel and of diverting said flow.

As also shown in FIG. 5, the drainage channel 8 may preferably be formed in such a way that it runs through a web 9 of the filter pin 5, which web 9 is designed to extend preferably in the axial direction of the filter pin 5 through the filtrate cavity 6. The plastic melt that is to be conveyed away during a start-up procedure can thus easily be guided sufficiently far away from the outlet channel 3 without any significant extension of the filter pin 5 in the axial direction being required for this.

The web 9 may in particular have a cross-section in the shape of a polygon, preferably in the shape of a hexagon. As also shown in FIG. 5, the filtering means 7 may be arranged between the web 9 and the inlet channel 2.

By virtue of the device according to the invention, it is possible to provide in a simple manner and without significant effort in terms of construction a device for filtering a plastic melt which at the same time can perform the functionality of a start-up device.

The invention claimed is:

1. A device for filtering a plastic melt, comprising a housing which has at least one inlet channel and at least one outlet channel for the plastic melt,
   wherein the at least one inlet channel is separated from the at least one outlet channel by at least one cavity for accommodating at least one filter pin which is axially and/or radially movable therein,
   wherein the at least one filter pin has a filter section to which at least one filtering means is detachably fastened so that the filter section of the at least one filter pin and the at least one filtering means define a filtrate cavity,
   wherein, in a working position of the filter pin, the plastic melt can pass from the at least one inlet channel through the filtering means to the filtrate cavity and the filtrate cavity is in fluid connection with the at least one outlet channel, and
   wherein, in a filter change position of the filter pin, the filtering means is freely accessible for replacing the filtering means, and at least one drainage channel is formed in the filter pin, wherein, in a start-up position of the filter pin, one end of the at least one drainage channel is in fluid connection with the at least one inlet channel in order to receive the plastic melt that is fed through the at least one inlet channel and to output the plastic melt at another end of the at least one drainage channel;

wherein the at least one drainage channel runs within at least one web in an axial direction through the filtrate cavity of the filter pin.

2. The device according to claim 1, wherein the detachable filtering means is arc-shaped in cross-section and covers an angle of at least 180° and at most 270° of the circumference of the at least one filter pin.

3. The device according to claim 2 wherein the angle is approximately 240° of the circumference.

4. The device according to claim 1, wherein the at least one filtering means is configured as a filter screen.

5. The device according to claim 1, wherein the at least one web is formed in the filter pin in the region of the filter section of the filter pin.

6. The device according to claim 5, wherein the filtering means is arranged between the at least one web and the at least one inlet channel.

7. The device according to claim 5, wherein the at least one web has a cross-section in the shape of a polygon.

8. The device according to claim 5, wherein the at least one web is arranged in such a way that a longitudinal axis of the filter pin is situated within the at least one web.

9. The device according to claim 5, wherein the at least one web has a cross-section in the shape of a hexagon.

10. The device according to claim 1, wherein the at least one filter pin has a pin section which corresponds in cross-section to the cross-section of the filter cavity in the housing, so that it fills the filter cavity between the inlet channel and the outlet channel when the at least one filter pin is in the filter change position.

* * * * *